Oct. 12, 1965  L. D. McCOY  3,211,477

CLAMPING DEVICE

Filed Oct. 25, 1962

INVENTOR
LAVERNE D. McCOY
BY M. B. Tasker
ATTORNEY

United States Patent Office 3,211,477
Patented Oct. 12, 1965

3,211,477
CLAMPING DEVICE
Laverne D. McCoy, Middletown, Conn., assignor to United Aircraft Corporation, East Hartford, Conn., a corporation of Delaware
Filed Oct. 25, 1962, Ser. No. 233,112
6 Claims. (Cl. 285—286)

This invention relates to a clamping device for connecting the flanges of two flanged members in the area of seal weld and is particularly applicable to liquid metal containing structures.

In various structures where it is required to contain high-temperature, corrosive liquid metals, non-structural lip-seal welds are provided between separable members which allow for cutting and rewelding the seal but do not provide the strength required to hold the members together. Examples of such structures are a vessel and its cover, or the two flanged casing members comprising a pump used for pumping liquid metal and its attached sump, as illustrated herein.

It is an object of this invention to provide an improved clamping device for holding two flange casing members together.

A further object of this invention is to provide a device for mechanically clamping two members together and eliminating stress on a hermetic seal between the members.

Figure 1:
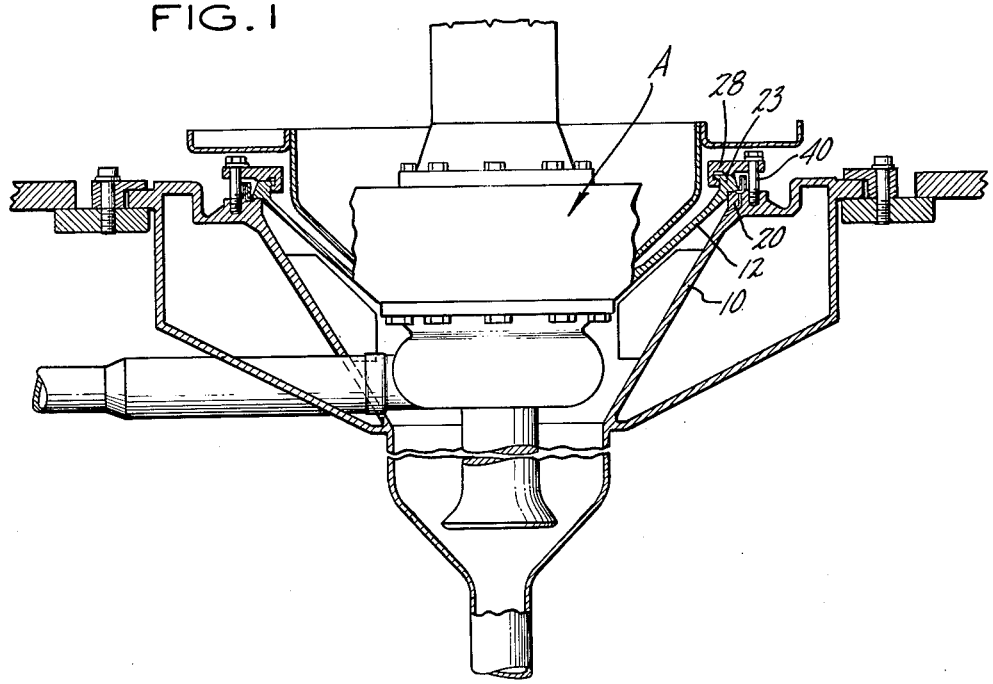
Figure 3:
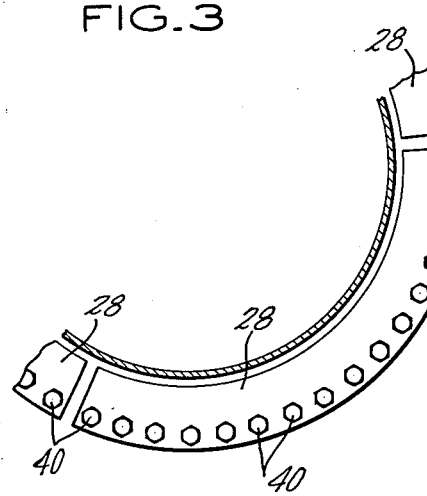
Figure 2:
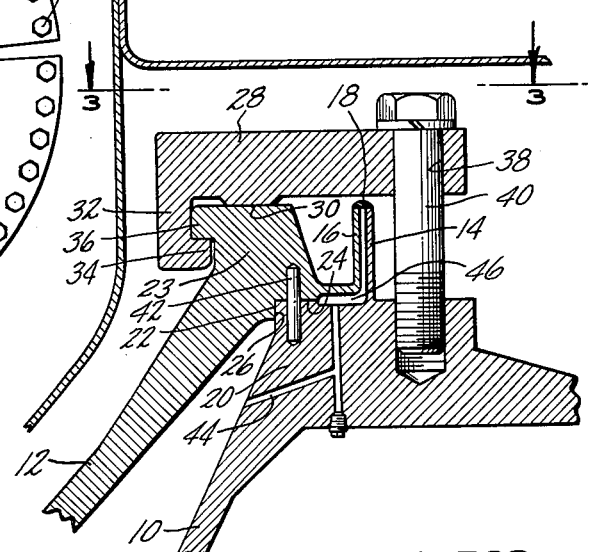

These and other objects and advantages will be pointed out or will be apparent from the following detailed description of an illustrative embodiment of the invention shown in the accompanying drawing. In this drawing, FIG. 1 is a sectional elevation of a vertically mounted sump pump A used for pumping high-temperature liquid metal; FIG. 2 is an enlarged sectional view through the flanged casing members of the pump and sump casings showing the clamping device of this invention in detail; and FIG. 3 is a sectional view taken on line 3—3 of FIG. 2.

The invention has been illustrated in connection with a vertically mounted liquid metal sump pump of the centrifugal type which has a sump casing 10 and a pump casing 12. The member 10 has a non-structural lip 14 and the member 12 has a similar lip 16 lying parallel therewith. The two lips are hermetically sealed by a weld 18 which extends around the peripheries of the lips. It will be noted that the lips are sufficiently extensive so that the weld 18 can be cut when it is desired to separate the members 10 and 12 while leaving sufficient material for cutting and rewelding several times.

The invention is concerned with improved clamping means for clamping the members 10 and 12 together structurally so the lip-seal weld above described will be relieved of any stress. Herein the members 10 and 12 are annular, but it will be understood that they could be rectangular or any other desired plan form. The member 10 has a peripheral flange 20 which seats in a peripheral rabbet 22 in at the base of a flange 23 on member 12, thus locating the two members relative to each other both vertically and laterally as viewed in FIG. 1. More specifically, the rabbet 22 provides a peripheral clamping seat 24 against which the flange 20 of member 10 seats while also providing a peripheral surface 26 which prevents lateral movement of the members 10 and 12 relative to each other. Since the members 10 and 12 are annular, as shown, flanges 20 and 23 are also annular. A plurality of clamping members 28 are provided around the periphery of members 10 and 12, one of which is shown in section in FIG. 1. The number and shape of these clamping members may vary widely under different design conditions but herein there are three truncated sectors, each extending slightly less than 120° about the periphery of the pump casing so that a slight peripheral gap is provided between the sectors when assembled. Each of these clamping members includes a sector which overlies the flange 23 of member 12 and is provided on its bottom surface with an arcuate boss 30 that engages the flange 23 of member 12 in an area which is further in on the radius than the seat 24. Each member 28 also has a depending peripheral flange 32 terminating in an outwardly directed flange 34 which engages beneath a horizontally extending lip 36. This lip extends around the inner periphery of flange 23 of member 12 and is engaged by the arcuate hook formed by 32, 34 of each of the clamping members 28.

The outer periphery of each member 28 is provided with spaced vertical holes 38 for clamping bolts 40 which extend through the bar and are each threaded at their ends into flange 20 in member 10. Thus each clamping member 28 is a lever, one end of which is pivoted under lip 36 as a fulcrum. The closure force exerted by bolts 40 at the free end of the lever is transmitted through arcuate boss 30 to urge the seat 24 against flange 20 of member 10 thereby relieving the lip-seal weld 18 of any mechanical stress. Vertical pins 42 may be provided in flanges 20 and 23 suitably spaced about their periphery to locate the casings prior to installing the bolts 40. When the bolts 40 for all of the clamping members 28 located about the periphery of the flanged members are suitably torqued, the members 10 and 12 are securely clamped together so that the lip-seal weld 18 cannot possible be stressed in any way and consequently a continuing hermetic seal between the two members 10 and 12 is assured.

A vent passage 44 is provided for the annular space 46 between lips 14 and 16 which communicates with the sump. From the above it will be evident that a most convenient and effective means has been provided for accomplishing flange support across a seal-weld area. This construction is presently being incorporated in pump-sump joint areas in the liquid metal circulating systems for nuclear reactors. While only one embodiment of the invention has been illustrated herein, it will be evident that the invention is applicable to many other situations where it is desired to connect two high-temperature liquid-metal containing members structurally together in the vicinity of a non-structural seal weld. It will also be understood that various changes may be made in the construction and arrangement of the parts without departing from the scope of the invention and the following claims.

I claim:

1. A clamping device for securing together the peripheral flanges of two liquid-metal-containing members, said flanges having mutually engaging surfaces, comprising a clamping member in the form of a lever extending across and generally parallel to the area of engagement of said surfaces, said clamping member having a fulcrum comprising a pivotal connection at one of its ends with one of said flanged members and a bolted connection at its other end with the other flanged member for applying a force to said lever which acts transverse to the longitudinal axis of said lever, said clamping member having a pressure engagement at a point intermediate its ends against said first mentioned flanged member through which the clamping force of said bolted connection is transmitted to said mutually engaging surfaces.

2. In a device for clamping two flanged members together to protect a non-structural lip-seal weld between them, comprising parallel peripheral and abutting surfaces on said members for positioning them one above the other, the uppermost of said members having an inwardly directed overhanging lip, a lever member overlying the abutting surfaces of said members in generally parallel relation with said surfaces having one end engaged under said lip, and a threaded clamping member extended through the other end of said lever member and through the more remote one of said flanged members for urging said abutting surfaces together, said lever member having a pressure engagement at a point intermediate its ends against said uppermost member through which the clamping force of said threaded clamping member is transmitted to said abutting surfaces.

3. The combination of two members having cooperating peripheral flanges, said flanges having areas of mutual engagement about the peripheries of said members, one of said flanges having a peripheral lip, an elongated clamping member extending lengthwise across said areas of engagement having an abutment at one of its ends engaging beneath said lip and having intermediate its ends a pressure engagement on said one flange, and a clamping bolt extended through the other end of said clamping member transverse to its length and through said other flanged member for clamping said flanges together.

4. In a pump for pumping high-temperature liquid metals, an upper cylindrical pump casing having an annular peripheral flange, a complemental lower sump casing having an annular peripheral flange abutting the flange of said pump casing, said flanges having external of said casings adjacent annular lips connected together to form a hermetic seal by means of a weld at their peripheries, the annular peripheral flange of said pump casing having an annular inwardly directed lip on its inner periphery, and means for clamping the abutting surfaces of said flanges together comprising a plurality of arcuate clamping members extended across and generally parallel to the abutment area of said flanges and having means thereon intermediate their ends engaging the flange on said pump casing, said clamping members having outwardly directed arcuate flanges on their inner peripheries which engage beneath said lip on the flange of said pump casing at one side of said seal and having a bolted connection at their outer peripheries with said sump casing at the other side of said seal.

5. In a pump for pumping high-temperature liquid metal, an upper pump casing having an open bottom provided with a peripheral flange, a complemental sump casing open at the top having a peripheral flange cooperating with the flange of said pump casing to complete said casing, external and parallel lips on said flanges welded together about their peripheries to form a hermetic seal between said casings, and means for structurally connecting said casings together at said flanges including an inwardly directed peripheral flange on said pump casing, and a plurality of peripheral clamping members extended radially across and generally parallel to the abutment area of said cooperating flanges and having means thereon intermediate their ends engaging the flange on the pump casing, said clamping members having at their inner ends a downwardly directed flange terminating in an outwardly directed rim which hooks under said inwardly directed flange on said pump casing, said clamping members having vertical directed apertures at their outer ends through which vertical bolts extend which are threaded into said sump casing.

6. In a pump for pumping high-temperature liquid metal, an upper pump casing having an open bottom provided with an annular peripheral flange, a complemental sump casing open at the top having an annular peripheral flange cooperating with the flange on said pump casing to complete said casing, external peripheral lips on said flanges which are parallel and adjacent each other, said lips welded together at their peripheries to form a hermetic seal between said casings, and means for structurally connecting said casings together at said flanges including an annular inwardly directed flange on said pump casing, a plurality of sector-shaped clamping members extended radially across and generally parallel to the abutment area of said cooperating flanges and having means thereon intermediate their ends engaging the flange on the pump casing, said clamping members having at their inner peripheries a downwardly directed arcuate flange terminating in an outwardly directed arcuate rim adapted to hook under the inwardly directed flange on said pump casing, said clamping members having vertical bolt receiving apertures at their outer peripheries, and vertical bolts received in said apertures and threaded into said sump casing.

References Cited by the Examiner
UNITED STATES PATENTS

| 1,708,528 | 4/29 | Voelker | 285—364 X |
| 1,892,587 | 12/32 | Schmieg | 285—420 X |
| 1,898,283 | 2/33 | Bawden | 285—309 X |
| 1,901,420 | 3/33 | Sternaman | 285—420 X |
| 1,926,107 | 9/33 | Morehead | 285—368 X |
| 2,262,356 | 11/41 | Corey | 285—412 X |
| 2,353,572 | 7/44 | Kuster et al. | 285—330 X |
| 2,714,020 | 7/55 | Yates | 285—368 X |

FOREIGN PATENTS

| 13,340 | 1908 | Great Britain. |

CARL W. TOMLIN, *Primary Examiner.*